United States Patent
Fukushige

(10) Patent No.: US 9,287,744 B2
(45) Date of Patent: Mar. 15, 2016

(54) WINDING STRUCTURE, ROTATING ELECTRIC MACHINE, AND ROTATING ELECTRIC MACHINE MANUFACTURING METHOD

(75) Inventor: Takashi Fukushige, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 307 days.

(21) Appl. No.: 13/821,741

(22) PCT Filed: Aug. 4, 2011

(86) PCT No.: PCT/JP2011/067894
§ 371 (c)(1),
(2), (4) Date: Mar. 8, 2013

(87) PCT Pub. No.: WO2012/039201
PCT Pub. Date: Mar. 29, 2012

(65) Prior Publication Data
US 2013/0169102 A1    Jul. 4, 2013

(30) Foreign Application Priority Data

Sep. 21, 2010 (JP) ................................. 2010-211193

(51) Int. Cl.
*H02K 3/28* (2006.01)
*H02K 15/06* (2006.01)
*H02K 3/12* (2006.01)

(52) U.S. Cl.
CPC .. *H02K 3/28* (2013.01); *H02K 3/12* (2013.01); *H02K 15/065* (2013.01); *Y10T 29/49009* (2015.01)

(58) Field of Classification Search
CPC ......... H02K 15/065; H02K 3/12; H02K 3/28; Y10T 29/49009
USPC .......................................... 310/198, 179, 180
See application file for complete search history.

(56) References Cited

U.S. PATENT DOCUMENTS

| | | | |
|---|---|---|---|
| 6,229,241 B1 * | 5/2001 | Ishigami et al. | 310/208 |
| 6,346,758 B1 * | 2/2002 | Nakamura | 310/216.004 |
| 6,819,026 B2 * | 11/2004 | Narita et al. | 310/266 |
| 6,833,648 B2 * | 12/2004 | Gorohata et al. | 310/180 |
| 6,894,417 B2 * | 5/2005 | Cai et al. | 310/198 |
| 7,268,455 B2 * | 9/2007 | Kouda et al. | 310/184 |
| 7,417,351 B2 * | 8/2008 | Mori et al. | 310/184 |
| 2008/0093948 A1 | 4/2008 | Naganawa | |
| 2010/0019609 A1 * | 1/2010 | Stout et al. | 310/198 |
| 2010/0102651 A1 * | 4/2010 | Mohle et al. | 310/54 |
| 2010/0181862 A1 * | 7/2010 | Krauth et al. | 310/198 |

FOREIGN PATENT DOCUMENTS

| | | |
|---|---|---|
| EP | 1 914 866 A2 | 4/2008 |
| JP | 2005-051981 A | 2/2005 |
| JP | 2008-104293 A | 5/2008 |
| JP | 2008-125212 A | 5/2008 |
| JP | 4234749 B2 | 3/2009 |

* cited by examiner

*Primary Examiner* — Alex W Mok
(74) *Attorney, Agent, or Firm* — Foley & Lardner LLP

(57) ABSTRACT

A winding structure for a rotating electric machine includes: a core including slots; and a coil including a first winding and a second winding combined by intersecting the first winding and the second winding with each other. Each straight portion of the coil is inserted into any one of two slots arranged at a given interval so that the coil is assembled to the core.

17 Claims, 10 Drawing Sheets

WINDING STRUCTURE, ROTATING ELECTRIC MACHINE, AND ROTATING ELECTRIC MACHINE MANUFACTURING METHOD

FIELD OF THE INVENTION

This invention relates to a winding structure and a rotating electric machine. In particular, this invention relates to downsizing of a coil end of a rotating electric machine (motor or generator) having a winding structure in a form of distributed winding.

BACKGROUND OF THE INVENTION

As a related technology, JP 4234749 B discloses a winding structure in a form of the distributed winding for a rotating electric machine. The winding structure includes windings in a form of normal winding in which a conducting wire is wound while both side surfaces are overlapping. The winding in each phase has portions in a crank shape at coil end portions, and the portions in the crank shape are arranged in proximity to each other in a widthwise direction. Moreover, the winding in each phase is wound across a plurality of slots of a stator iron core of the rotating electric machine.

SUMMARY OF THE INVENTION

However, a certain winding passes over and under a neighboring winding in a very narrow region including the crank shape. As a result, the winding is forced to undergo significant deformation. When the size of the crank shape is increased in order to reduce the amount of deformation, eventually, the downsizing of the coil end becomes difficult.

In view of the above-mentioned problem, this invention has an object to downsize a coil end of a rotating electric machine including a winding structure in a form of the distributed winding.

According to an aspect of this invention, a winding structure for a rotating electric machine includes: a core including slots; and a coil including a first winding and a second winding combined by intersecting the first winding and the second winding with each other. Each straight portion of the coil is inserted into any one of two slots arranged at a given interval so that the coil is assembled to the core.

A detailed description of this invention as well as other features and advantages thereof is given in the following description of the specification, and is also illustrated in the accompanying drawings.

DESCRIPTION OF THE PREFERRED EMBODIMENTS

Figure 1:
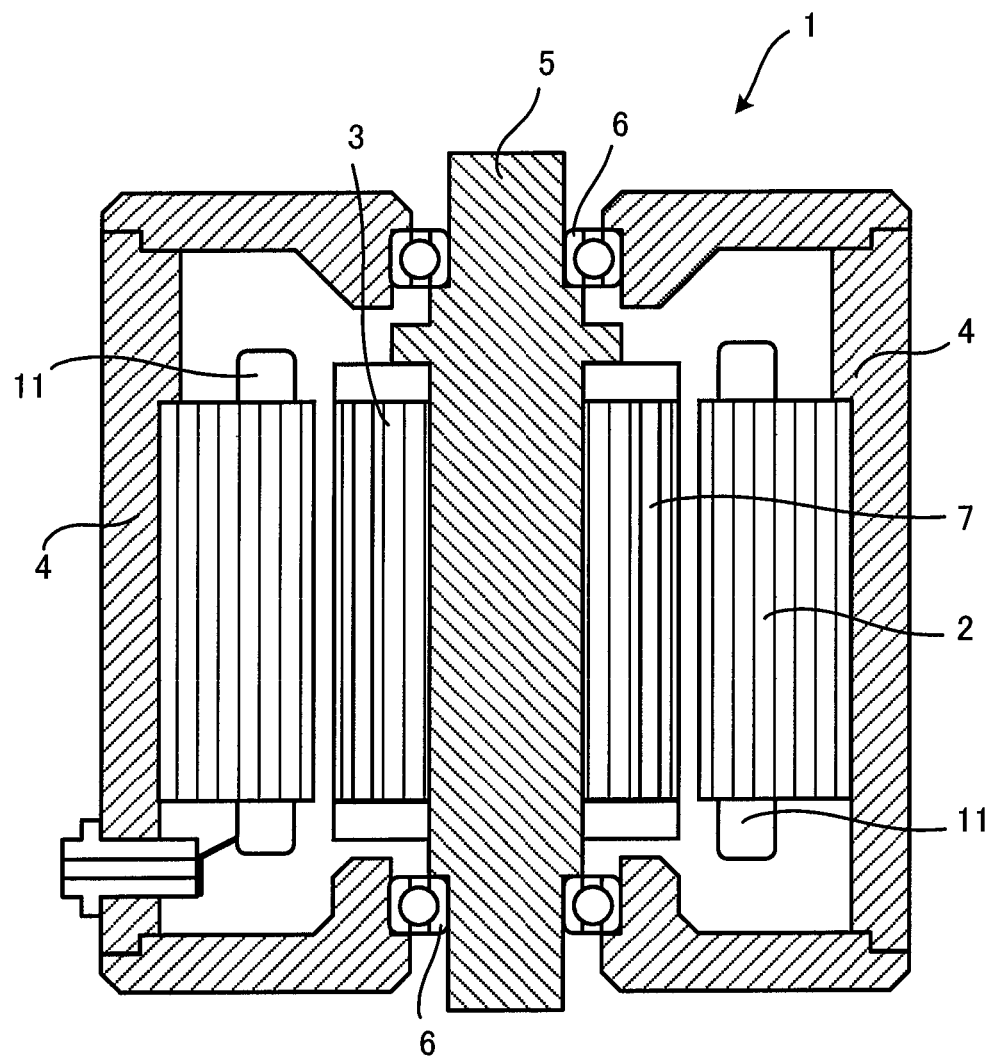
FIG. 1 is a cross sectional view taken along an axial direction of a rotating electric machine.

A more detailed description is now given of an embodiment of this invention referring to the drawings.

FIG. 1 is a schematic cross sectional view taken along an axial direction of a rotating electric machine having a winding structure according to the embodiment. The rotating electric machine functions as a motor, a generator, or both thereof.

The rotating electric machine 1 includes a stator 2, a rotor 3 arranged coaxially with the stator 2, and a case 4 accommodating the stator 2 and the rotor 3. The stator 2 and the rotor 3 have substantially circular shapes, and the stator 2 is provided so as to enclose an outer periphery of the rotor 3. A rotation shaft 5 is fixed to a center portion of the rotor 3, and the rotation shaft 5 is rotatably supported through an intermediation of bearings 6 by the case 4. With this structure, the rotor 3 can rotate with respect to the stator 2 fixed to the case 4.

The rotor 3 includes a plurality of permanent magnets 7 arranged at equal intervals in a circumferential direction. The rotor 3 rotates about the rotation shaft 5 by a reaction force of the permanent magnets generated by a rotating magnetic flux provided by a winding body 11 of the stator 2.

Figure 2:
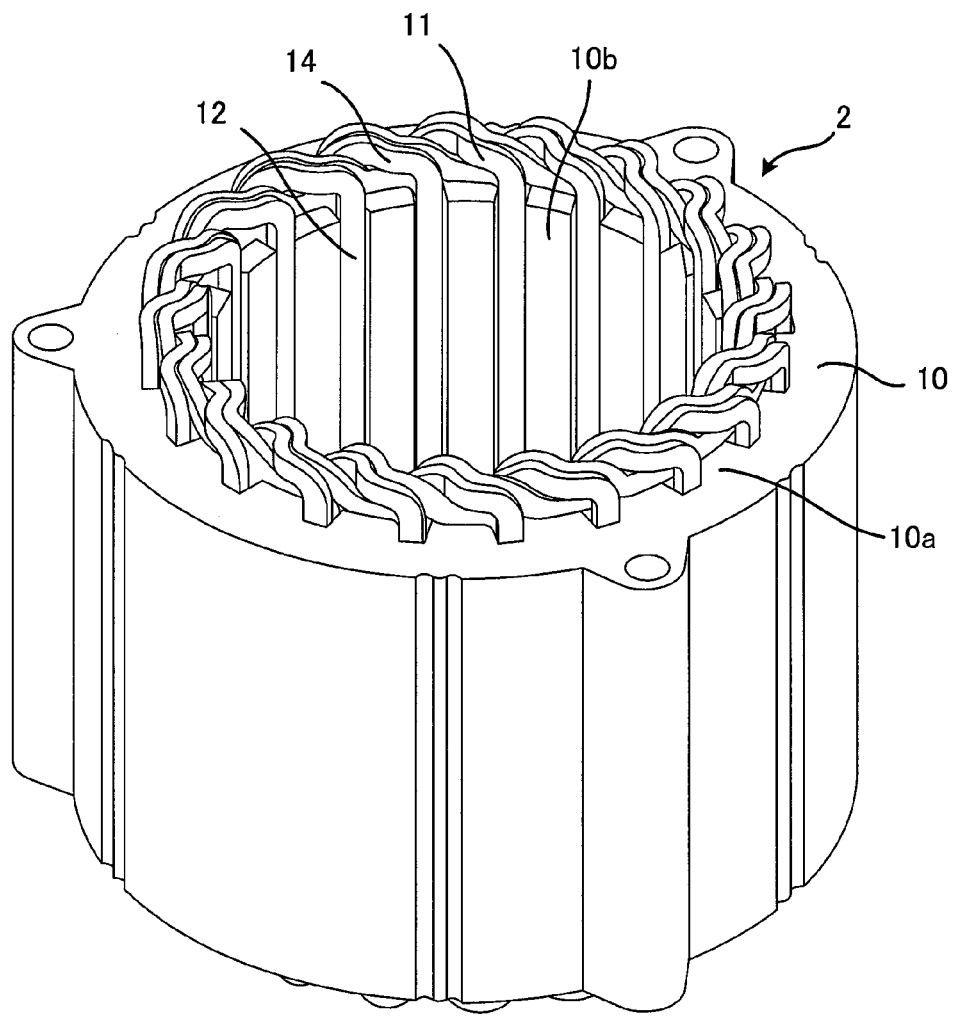
FIG. 2 is a perspective view of a stator of the rotating electric machine.

FIG. 2 is a perspective view of the stator 2. The stator 2 includes a stator iron core 10 having a substantially circular shape, and the winding body 11 fixed to an inner peripheral portion of the stator iron core (stator core) 10. The stator iron core 10 includes a main body portion 10a having a substantially circular shape, and a plurality of tooth portions (teeth) 10b radially protruding from the main body portion 10a. A slot 12 for accommodating the winding body 11 is formed between the neighboring tooth portions 10b. The plurality of tooth portions 10b are arranged in the peripheral direction at predetermined angular intervals. The plurality of slots 12 are also arranged in the peripheral direction at predetermined angular intervals.

The winding body 11 includes a plurality of coils 14 wound in the distributed manner on the slots 12. The plurality of coils 14 include the coils 14 in respective phases.

Figure 3B:
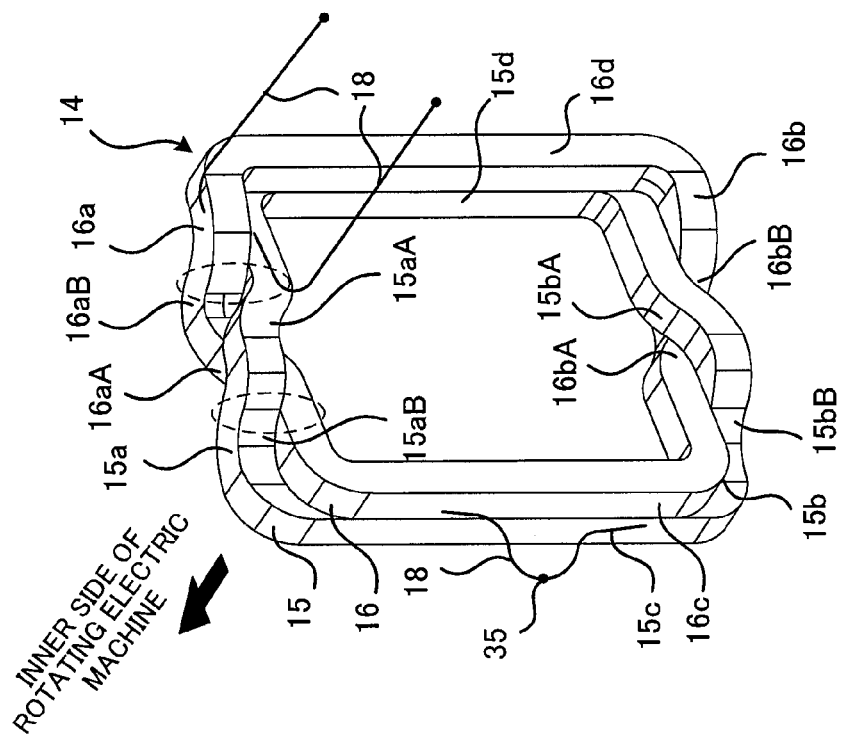
FIG. 3B is a perspective view illustrating another example of the coil.
Figure 3A:
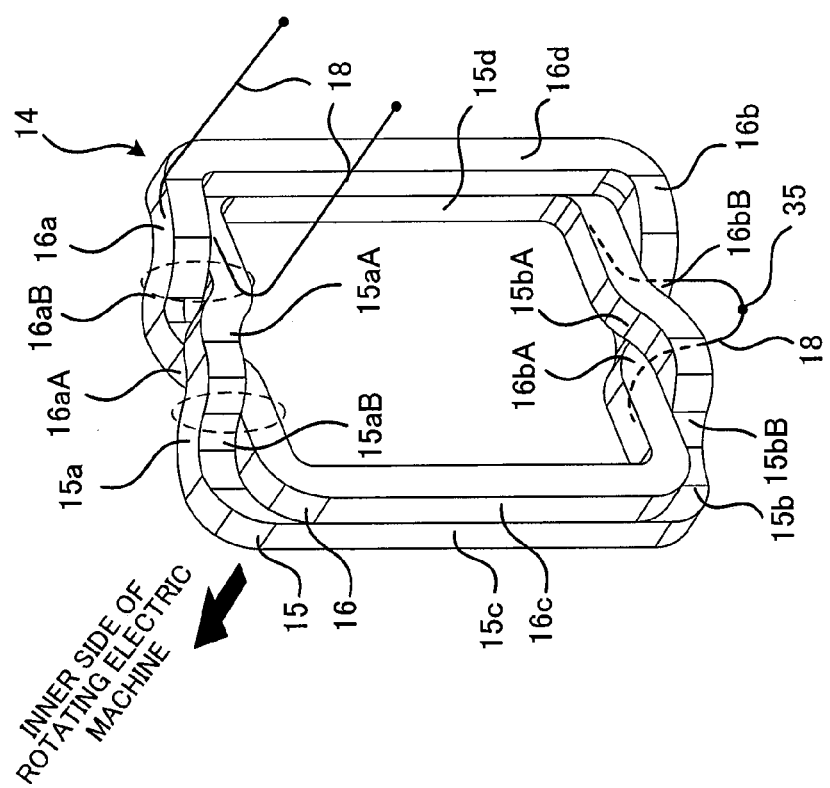
FIG. 3A is a perspective view illustrating an example of a coil.
Figure 4:
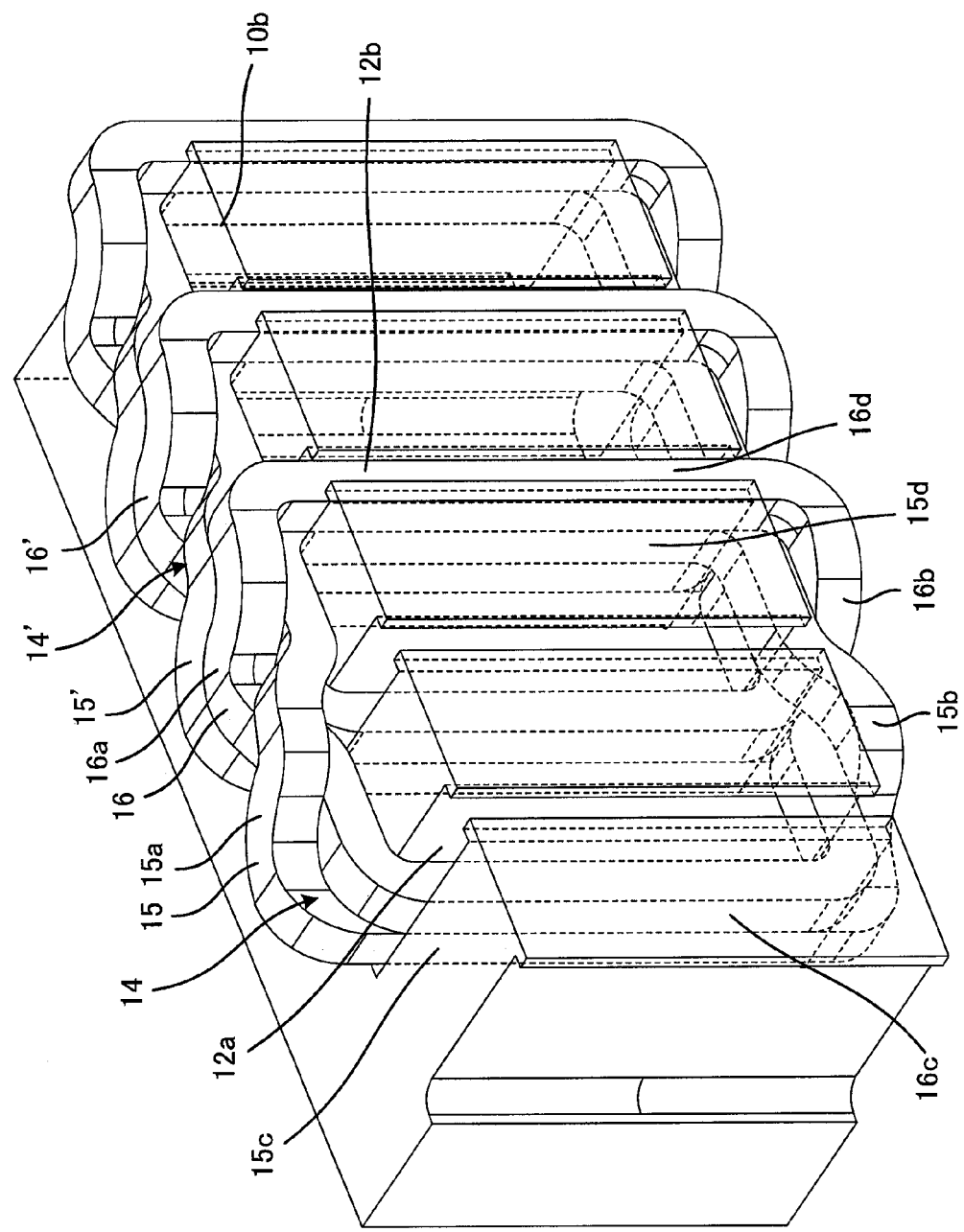
FIG. 4 is a partial development view illustrating a part of the stator developed along a circumferential direction.

FIG. 3A and FIG. 3B are perspective views illustrating each coil 14. FIG. 4 is a partial development view illustrating the stator 2 having a substantially circular shape that is developed in a circumferential direction.

As illustrated in FIG. 3A and FIG. 3B, the coil 14 includes a first winding 15 and a second winding 16. The first winding 15 and the second winding 16 constitute the single coil 14 as a result of respective conducting wires 30 being connected to each other at a connection portion 35. The conducting wire 30 is a metal wire such as a copper wire. Coil end portions 15a and 15b on a top side and a bottom side of the first winding 15 respectively include first crank-shape portions 15aA and 15bA bending in the rotation axis direction of the rotating electric machine 1. Moreover, the coil end portions 15a and 15b on the top side and the bottom side of the first winding 15 respectively include second crank-shape portions 15aB and 15bB bending in the radial direction of the rotating electric machine 1. It should be noted that the coil end portions are portions of the winding located on end surfaces in the axial direction of the stator iron core 10 (tooth portion 10b)

Moreover, coil end portions 16a and 16b on a top side and a bottom side of the second winding 16 respectively include first crank-shape portions 16aA and 16bA bending in the rotation axis direction of the rotating electric machine 1. The coil end portions 16a and 16b on the top side and the bottom side of the second winding 16 respectively include second crank-shape portions 16aB and 16bB bending in the radial direction of the rotating electric machine 1.

As indicated by rings of a dotted line of FIG. 3A and FIG. 3B, the first crank-shape portions 15aA and 15bA and the second crank-shape portions 15aB and 15bB of the first winding 15 are respectively fitted to and intersect with the second crank-shape portions 16aB and 16bB and the first crank-shape portions 16aA and 16bA of the second winding 16. In other words, the first crank-shape portions 15aA and 15bA of the first winding 15 bending in the rotation axis direction and the second crank-shape portions 16aB and 16bB of the second winding 16 bending in the radial direction oppose to and intersect with each other. The second crank-shape portions 15aB and 15bB of the first winding 15 bending in the radial direction and the first crank-shape portions 16aA and 16bA of the second winding 16 bending in the rotation axis direction oppose to and intersect with each other.

Figure 9A:
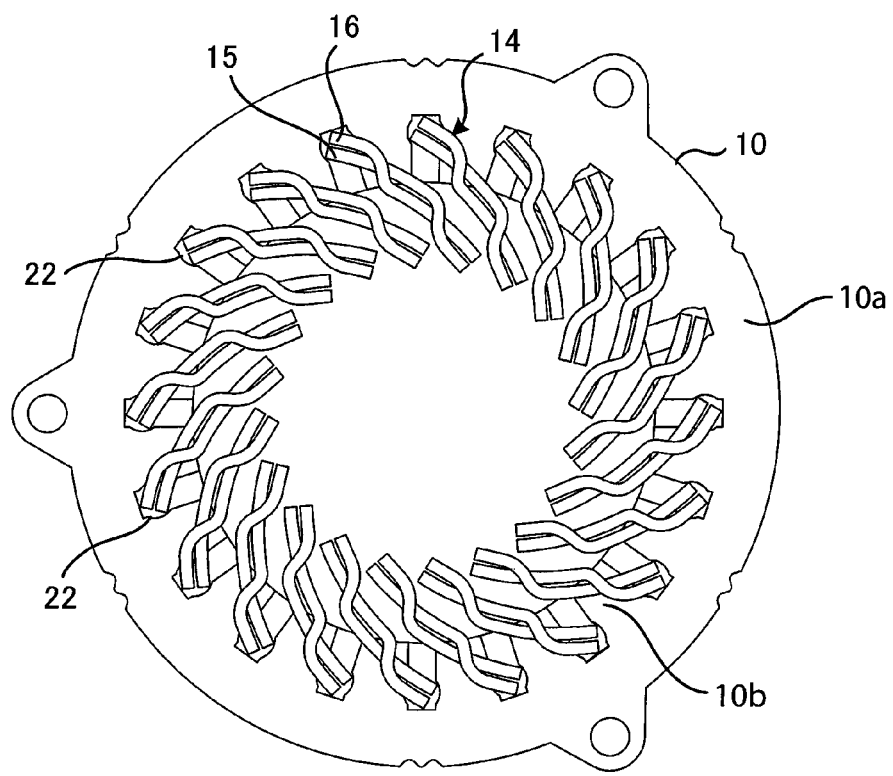
FIG. 9A is an end view illustrating a state where straight portions on one side of a plurality of coils are simultaneously inserted into the slots.
Figure 9B:
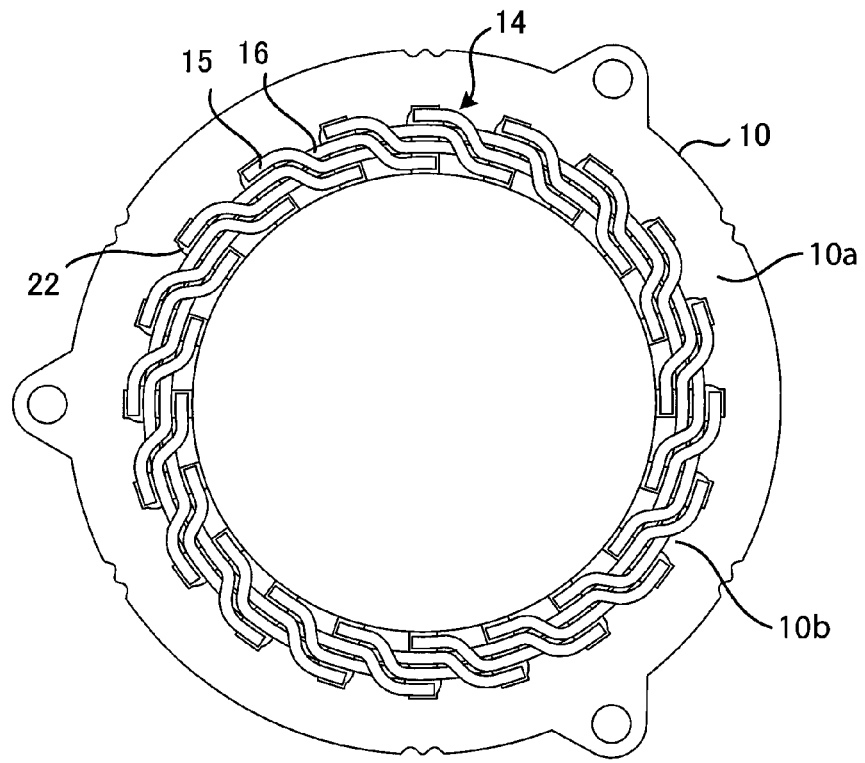
FIG. 9B is an end view of the stator after finished.

This configuration eliminates such a situation that a certain winding passes both over and under a winding assembled to a neighboring slot in a very narrow region (refer to FIG. 4 and FIG. 9B). As a result, the winding does not undergo significant deformation, and, compared with the related technology, the coil ends can be downsized. Moreover, it is not necessary to significantly separate the coil end portions from the slots, and accordingly, compared with the related technology and a general distributed winding, the coil ends can be downsized significantly.

As illustrated in FIG. 4, due to the presence of the first and second crank-shape portions, the first winding 15 of a certain coil 14 (first coil) is inserted into the slot while passing under the coil end portion of a first winding 15 of another neighboring coil 14' (second coil). Conversely, a second winding 16' of the neighboring coil 14' is inserted into the slot while passing under the coil end portion of the second winding 16 of the coil 14.

Further, the first winding 15 of the certain coil 14, on the tooth portion 10b, extends in parallel with and overlaps the second winding 16' of the neighboring coil 14' with a shifted position therebetween (also refer to FIG. 9B). In other words, the first winding 15 of the coil 14 extends on the tooth portion 10b, in contact with the second winding 16' of the neighboring coil 14' in a direction perpendicular to the axial direction of the rotating electric machine 1 (namely, the radial direction). The second winding 16 of the certain coil 14, on the tooth portion 10b, extends in parallel with and overlaps the first winding 15' of the neighboring coil 14' with a shifted position therebetween. In other words, the second winding 16 of the coil 14 extends on the tooth portion 10b, in contact with the first winding 15' of the neighboring coil 14' in the direction perpendicular to the axial direction of the rotating electric machine 1 (namely, the radial direction). As a result, a space factor of the windings increases, and an output torque of the rotating electric machine 1 increases. It should be noted that the space factor of the windings is obtained by dividing a total cross sectional area of the conducting wires 30 (including coating) inside the slot by a slot cross sectional area in the direction perpendicular to the rotational axis.

The coil 14 fits into the two slots having a given interval, and is thus assembled to the stator iron core 10. In other words, straight portions of the first winding 15 and the second winding 16 (straight portions of the coil) are inserted into any one of the two slots having the given interval. In this case, in one slot 12a, a left straight portion 15c of the first winding 15 is located on a radially outer side of a left straight portion 16c of the second winding 16 in the rotating electric machine 1. In another slot 12b, a right straight portion 15d of the first winding 15 is located on a radially outer side of a right straight portion 16d of the second winding 16 in the rotating electric machine 1.

The interval of the two slots into which the coil 14 is inserted, namely a winding pitch (coil pitch), is set to two. In other words, the coil 14 (first winding and second winding) are wound around two tooth portions neighboring each other on both sides of one slot. In this case, in all winding pitches, the coil end of the rotating electric machine 1 can be downsized maximally.

It should be noted that, on the coil end located on the end surface in the axial direction of the stator iron core 10, the number of coils (pairs of windings) is the same as the winding pitch. As a result, when the winding pitch is large, a large number of pairs of windings need to intersect at the crank-shape portions, and the effect of downsizing is reduced by gaps generated when the stator 2 is assembled, and slight projections of the crank-shape portions. On the other hand, when the winding pitch is one, the general concentrated winding is provided, and windings do not need to intersect. Thus, when the winding pitch is two, the downsizing can be achieved maximally.

The number of intersections of the first winding 15 and the second winding 16 at the coil end portion is two. When the coil pitch is two and at least two intersections are provided, the winding assembled to a certain slot can be wound while only passing over or under a winding assembled to a neighboring slot without bending significantly.

Figures 5A, 5B, 5C:
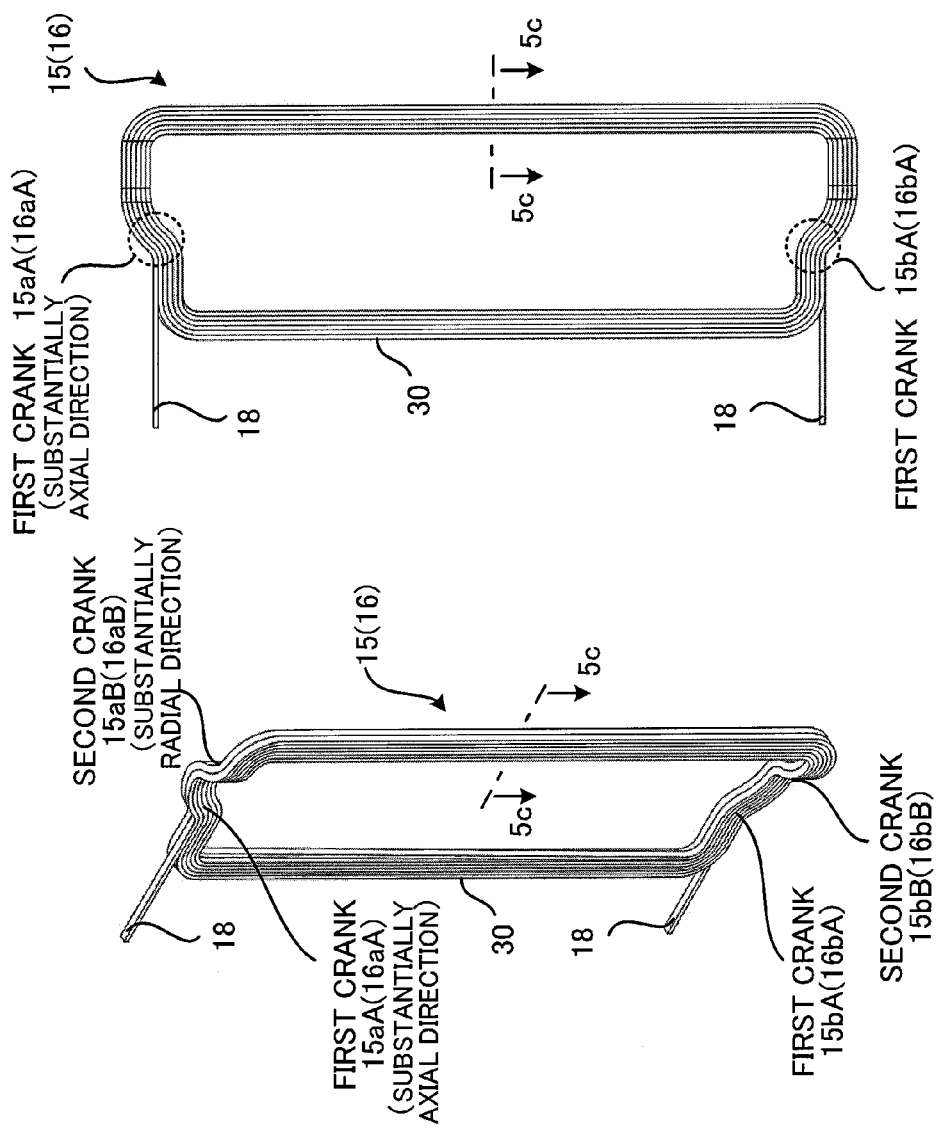
FIG. 5A is a perspective view of a first winding or a second winding.
FIG. 5B is a side view of the first winding or the second winding.
FIG. 5C is a cross sectional view of the first winding or the second winding.

FIG. 5A and FIG. 5B illustrate details of the first winding 15 and the second winding 16. Though the first winding 15 and the second winding 16 are different in shape more or less due to the circular shape of the stator 2, the first winding 15 and the second winding 16 have substantially the same shapes. Assuming that FIG. 5A corresponds to the first winding 15, a view obtained by inverting FIG. 5A in the left/right direction substantially corresponds to the second winding 16. FIG. 5C illustrates a cross sectional view of the winding.

The first winding 15 and the second winding 16 are in a form of the normal winding, and the conducting wires 30 constituting the first winding 15 and the second winding 16 are aligned. As a result, the winding space factor in the slot increases. The normal winding increases the winding space factor in the slot to the same level of that of the concentrated winding. The first and second crank-shape portions provided on the windings in the normal winding provide such a configuration that the first winding 15 (or the second winding 16) of a certain coil is inserted into the slot while overlapping the coil end portion of the first winding 15 (or the second winding 16) of another coil (refer to FIG. 4 and FIG. 9A). Thus, the winding passing over an irrelevant slot to which the winding is not assembled does not block the irrelevant slot, resulting in an increase in the winding space factor.

Figure 10:
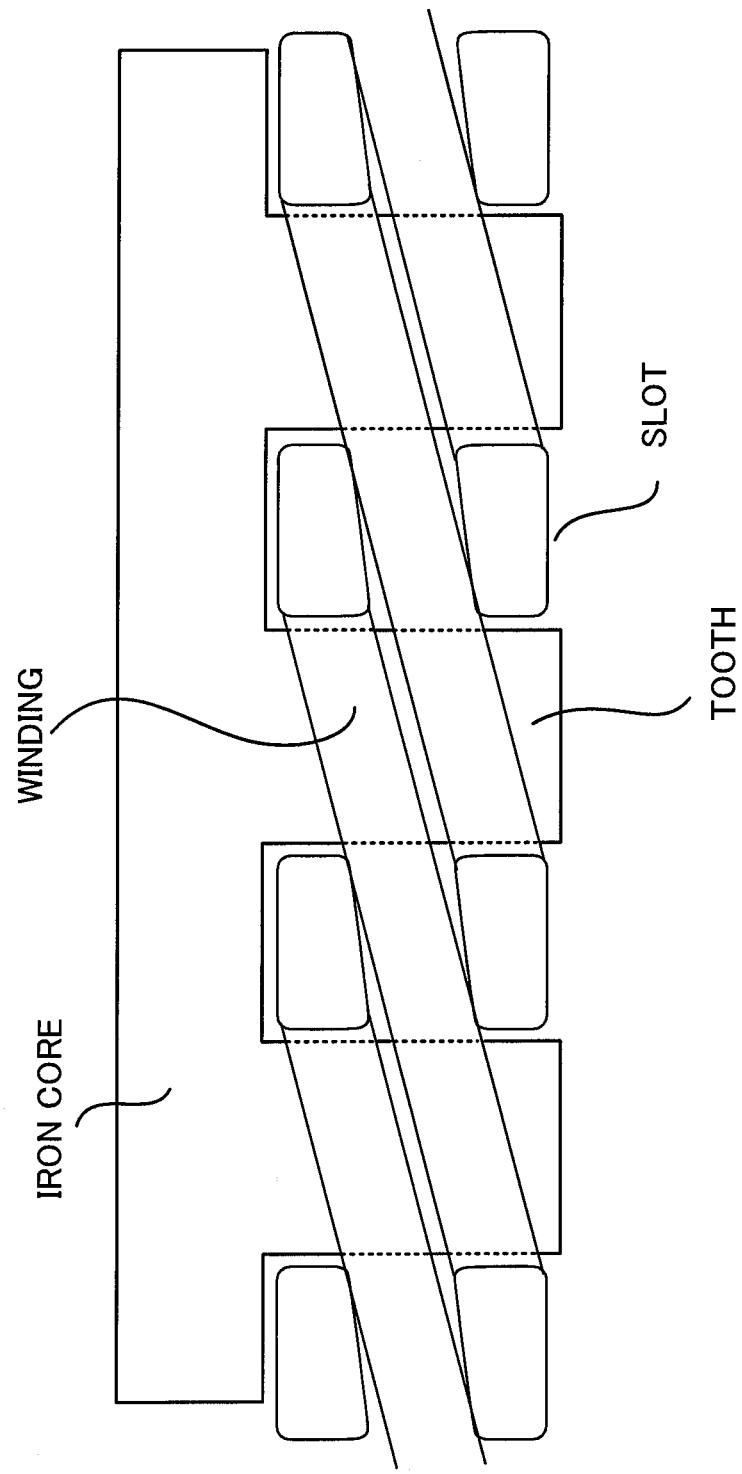
FIG. 10 is a diagram illustrating a winding structure in which the normal winding is applied to a winding in a form of the conventional and general distributed winding.

When the normal winding is applied to a winding in the form of the conventional general distributed winding, as illustrated in FIG. 10, coil end portions of windings wound in the normal form pass over irrelevant slots, and block the slots. In this case, the winding space factor inside the slot is significantly decreased, and the rotating electric machine is upsized, resulting in an increase in loss. Therefore, for the conventional distributed winding, a winding in non-normal form is employed, and, by significantly separating the coil end portion from the slot, the irrelevant slot is prevented from being blocked. As a result, the winding space factor inside the slot is improved, but the winding is in the non-normal form, and hence there is a limit to the improvement in the space factor, and the coil end is upsized.

As illustrated in FIG. 5A and FIG. 5B, the winding is formed of two layers wound in a form of the a winding. As a result, the winding space factor inside the slot further increases. Moreover, as illustrated in FIG. 5C, the cross sectional shape of the conducting wire (element wire) 30 of the winding is substantially rectangular. In other words, as the conducting wire 30 of the winding, a square wire is employed. As a result, the winding space factor inside the slot further increases.

The number of turns of the winding is a non-integer (fraction), and locations of two leads 18 are respectively assigned to the end portions on the both sides. As a result, by reducing the number of turns of the wiring straight portion on one side by one turn, a space used for a winding stage change and the like can be secured. Moreover, there is a surplus space on an outer periphery of the coil end portions, and hence by distributing connection portions for the first winding and the second winding to the both sides of the rotating electric machine, the space is efficiently used, and therefore, the coil ends can be downsized.

As illustrated in FIG. 3A, the first winding 15 and the second winding 16 may form the one coil 14 as a result of the respective conducting wires 30 being serially connected to each other at the connection portion 35 on the end surface side on one side of the stator 2. As a result, the coil ends can be downsized.

Moreover, as illustrated in FIG. 3B, when the first winding 15 and the second winding 16 are produced by means of the a winding, the first winding 15 and the second winding 16 may be connected to each other inside the slot at the connection portion 35 of the straight portions 15c and 16c of the windings. The arrangement of the connection portion 35 at the straight portions of the windings does not result in such a situation that the connection portion 35 becomes an obstacle against the formation of the crank-shape portions, and therefore the coil ends can be downsized.

Figure 6:
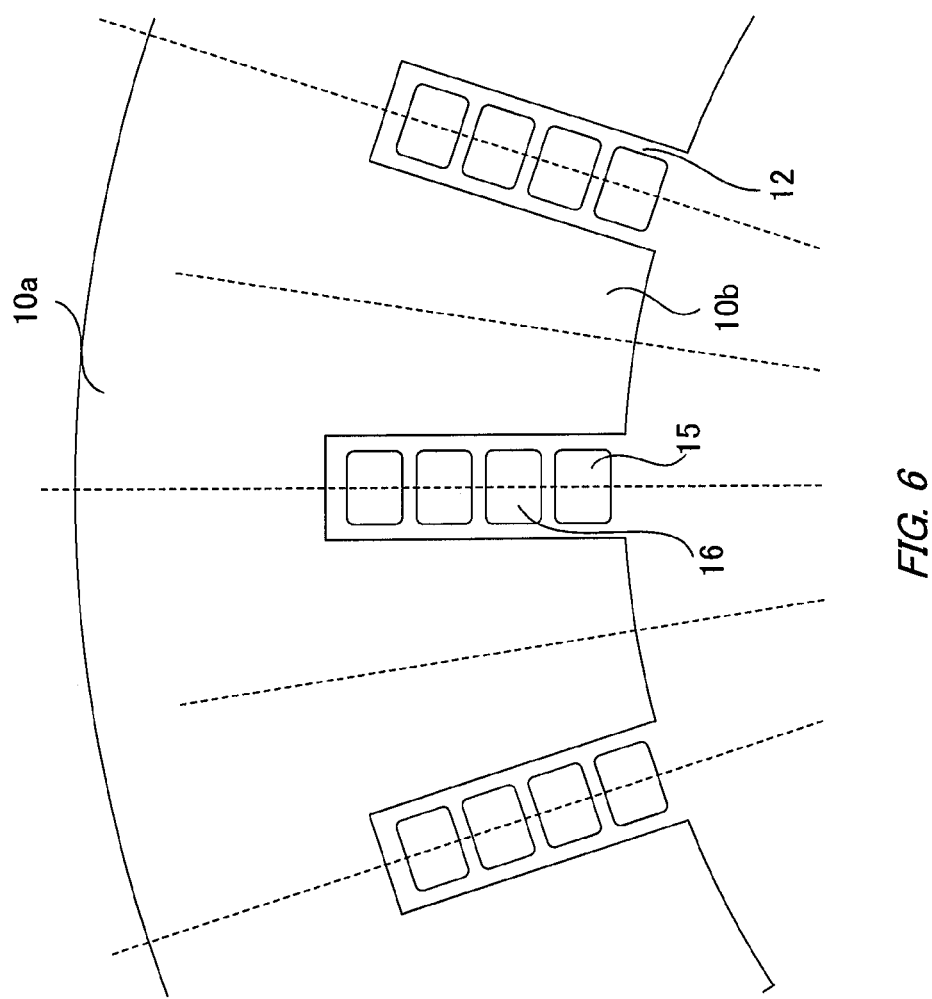
FIG. 6 is a partial cross sectional view of the stator.

As illustrated in FIG. 6, the tooth portion 10b of the stator iron core (stator core) 10 may have a tapered shape. Due to the cross sectional shape of the windings, the slot 12 has a substantially rectangular shape, and the shape of the tooth portion 10b is thus the tapered shape. As a result, the magnetic flux density decreases at the bottom of the tooth portion 10b, leading to reduction in core loss.

Figure 7:
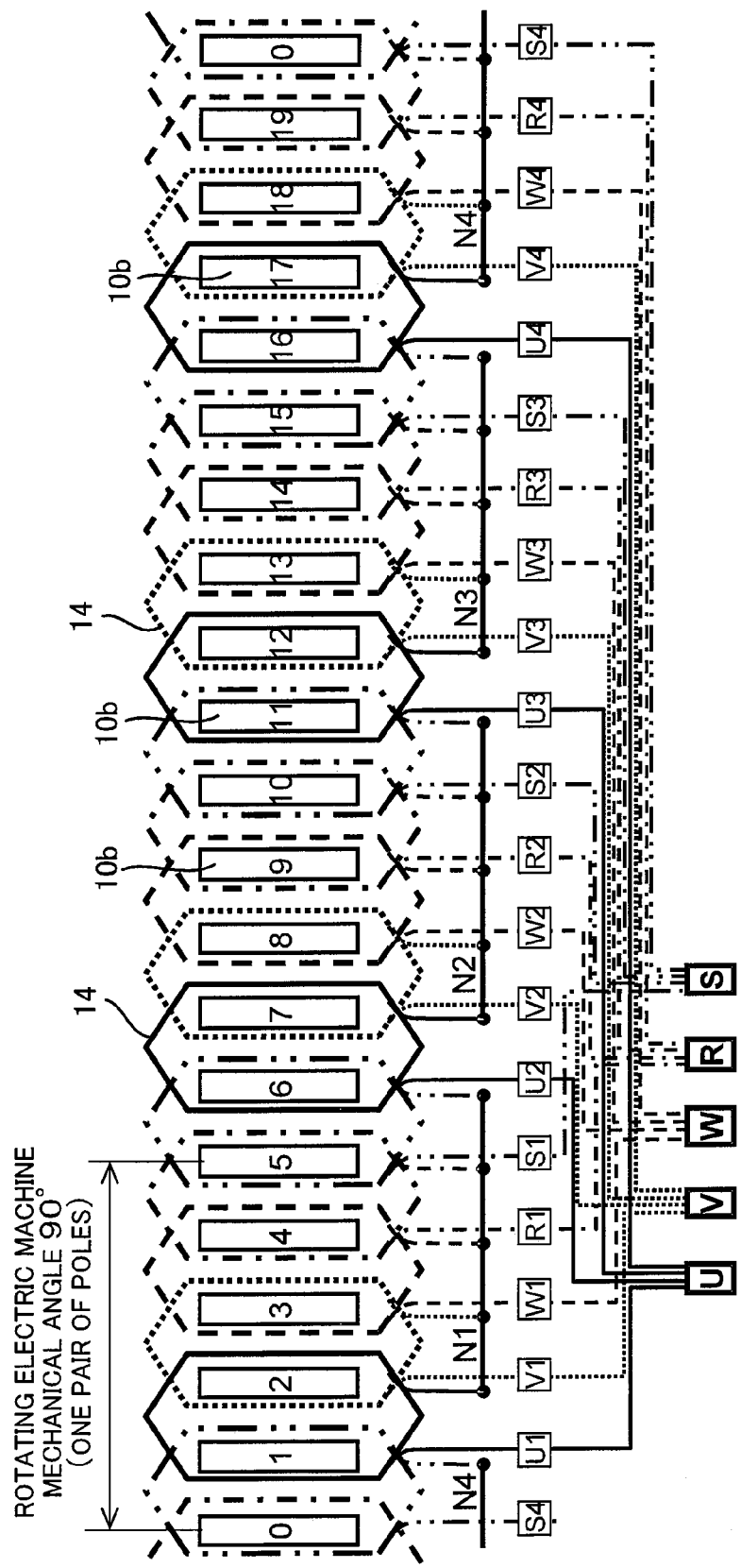
FIG. 7 is a circuit diagram of the windings of the rotating electric machine.

FIG. 7 is an example of a circuit diagram of the windings of the rotating electric machine 1. Typically, the number C of the coils 14 is represented by (P/2)×m, where P denotes the number of magnetic poles, and m denotes the number of phases of a drive power supply for the rotating electric machine. Moreover, the number C of the coils 14 is equal to the number $S_L$ of the slots 12. In FIG. 7, the number P of poles is eight (number of pairs of poles is four), the number m of the phases is five, the number $S_L$ of slots is 20, and the pitch of the winding is two. The connection method is the Y connection, and is the four parallel/one serial connection type in which the number of neutral points (N1-N4) is four. The coils in the five phases are respectively connected to the U, V, W, R, and S phases of the drive power supply.

By increasing the short-pitch factor K (short-pitch winding factor), the rotating electric machine 1 can have a high torque. When $S_L$ denotes the number of the slots, P denotes the number of the poles, and L denotes the winding pitch, the short pitch factor is represented by Equation (1) below. Therefore, the number $S_L$ of slots is preferably twice to three times the number P of magnetic poles. In the example of FIG. 7, the number $S_L$ of slots is 2.5 times the number P of the magnetic poles.

$$K = \sin\left(\frac{\pi LP}{2S_L}\right) \quad (1)$$

Moreover, by increasing the distribution factor (distributed winding factor), the torque can be increased. Among major combinations of the number of slots and the number of poles, combinations which can increase not only the short-pitch factor but also the distribution factor when the winding pitch is two include a combination in which the number of phases is five and a ratio of the number $S_L$ of slots to the number P of magnetic poles is 5:2, and a combination in which the number of phases is three and a ratio of the number $S_L$ of slots to the number P of magnetic poles is 3:1.

Figure 8B:
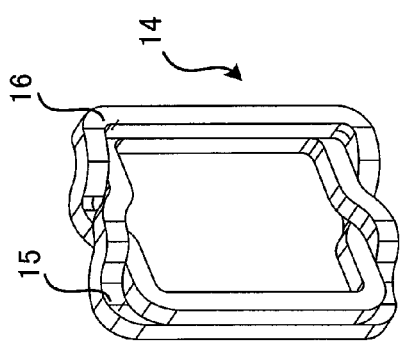
FIG. 8B is a diagram illustrating a second step of the manufacturing method for the stator.
Figure 8D:
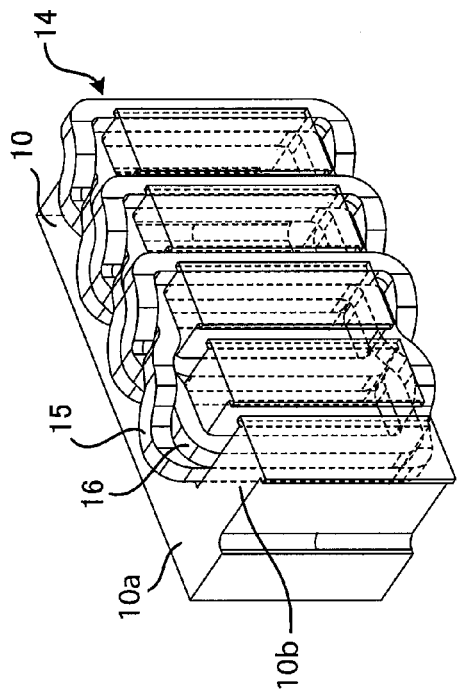
FIG. 8D is a diagram illustrating the stator on which a winding body is arranged.
Figure 8A:
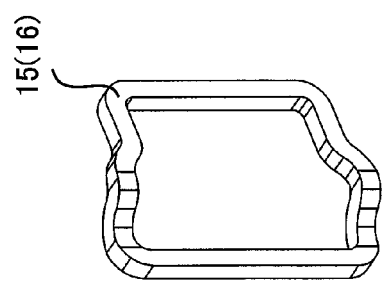
FIG. 8A is a diagram illustrating a first step of a manufacturing method for the stator.

FIG. 8A to FIG. 8D illustrate a manufacturing method for the stator 2. As illustrated in FIG. 8A, as a first step, a plurality of first windings 15 and a plurality of second windings 16 in a form of the normal winding as illustrated in FIG. 5A are formed. As illustrated in FIG. 8B, as a second step, the first windings 15 and the second windings 16 are respectively combined, and a plurality of coils 14 are thus produced.

In the second step, the first winding 15 and the second winding 16 are combined so as to intersect twice at the respective coil end portions. The first crank-shape portion of the first winding 15 is fitted to the second crank-shape portion of the second winding 16. The second crank-shape portion of the first winding 15 is fitted to the first crank-shape portion of the second winding 16.

Figure 8C:
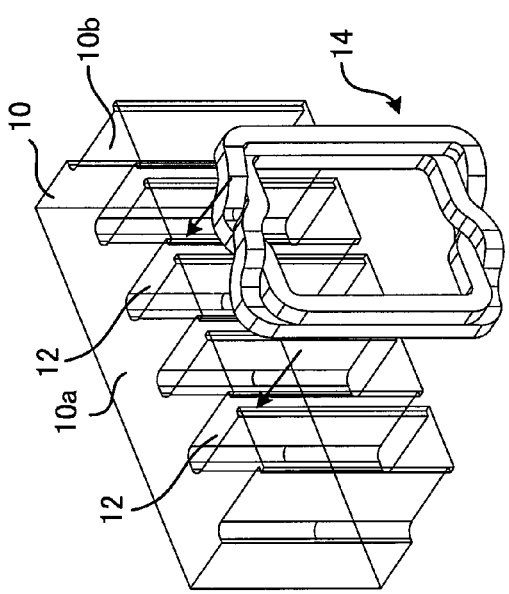
FIG. 8C is a diagram illustrating a third step of the manufacturing method for the stator.

As illustrated in FIG. 8C and FIG. 8D, in a third step, each of the plurality of coils 14 is inserted into two slots, thereby being assembled to the stator iron core 10. In a fourth step, the coil 14 is pushed into the slots so that the first winding 15 (or the second winding 16) of the coil 14 overlaps the second winding 16 (or the first winding 15') of a neighboring coil 14' at the tooth portion 10b in the radial direction of the stator 2.

As illustrated in FIG. 9A and FIG. 9B, in the third step, the plurality of coils 14 may be simultaneously inserted into the slots 12, thereby being assembled to the stator iron core 10. As a result, the stator 2 is properly assembled. It should be noted that the two slots into which the coil 14 is inserted are not parallel with each other, and hence after one straight portion of each of the coils 14 is inserted into one slot, the other straight portion of each of the coils 14 needs to be inserted into the other slot while turning the each of the coils 14. In order to provide a space required for this turn, a cutout portion 22 is provided at the bottom of the tooth portion 10b. As a result, the assembly of the stator iron core 10 and the winding body 11 is facilitated.

In the above-mentioned embodiment, the description is given of the case where the winding structure is applied to the stator, but for a rotating electric machine in which a winding body is provided for an iron core of a rotor, the winding structure described above may be applied to the rotor.

According to the embodiment, the winding structure of the rotating electric machine 1 includes the iron core 10 (also simply referred to as core) having the slots 12, and the coils 14 having the first winding 15 and the second winding 16 which are combined by intersecting the first winding 15 and the second winding 16 with each other. Each of the straight portions of the coil 14 is inserted into any one of the two slots 12 having the given interval so that the coil 14 is assembled to the iron core 10. Therefore, the coil ends of the rotating electric machine, and further, the stator (or the rotor) thereof can be downsized.

The coil end portions 15*a*, 15*b*, 16*a*, and 16*b* of the first winding 15 and the second winding 16 respectively include the first crank-shape portions 15*a*A, 15*b*A, 16*a*A, and 16*b*A bending in the rotation axis direction of the rotating electric machine 1, and the second crank-shape portions 15*a*B, 15*b*B, and 16*a*B, and 16*b*B bending in the radial direction of the rotating electric machine. The first crank-shape portions 15*a*A and 15*b*A of the first winding 15 are fitted to and thus intersect with the second crank-shape portions 16*a*B and 16*b*B of the second winding 16. The second crank-shape portions 15*a*B and 15*b*B of the first winding 15 are fitted to and thus intersect with the first crank-shape portions 16*a*A and 16*b*A of the second winding 16. As a result, the coil ends of the rotating electric machine can more surely be downsized.

The first winding of a certain coil 14 (first coil), at the coil end portion, overlaps the second winding 16 of another coil 14' (second coil) with a shifted position therebetween. Moreover, the second winding 16 of the certain coil 14, at the coil end portion, overlaps the first winding 15' of the another coil 14' with a shifted position therebetween. As a result, the space factor of the windings (conducting wires) inside the slot increases, and the output torque of the rotating electric machine increases.

When the winding pitch at which the coil 14 is wound on the slots 12 of the iron core 10 is two, the coil ends of the rotating electric machine can be downsized maximally. The number of intersections between the first winding 15 and the second winding 16 at the coil end portions is two. As a result, the first winding 15 and the second winding 16 only pass over or under a winding assembled to a neighboring slot, and are wound without a useless space.

The number of the slots of the iron core 10 is twice to three times the number of the magnetic poles of the rotating electric machine, and hence the short-pitch factor thus increases, and the rotating electric machine has a high torque. It is preferred that the number of the phases of the rotating electric machine 1 be five, and the ratio of the number of slots of the iron core 10 to the number of the magnetic poles of the rotating electric machine be 5:2. Alternatively, it is preferred that the number of the phases of the rotating electric machine be three, and the ratio of the number of slots of the iron core 10 to the number of the magnetic poles of the rotating electric machine be 3:1. As a result, the distribution factor increases, and the rotating electric machine 1 has a higher torque.

The first winding 15 and the second winding 16 are wound in the normal form, and a conductor space factor in the slot can thus be increased to the same level as that of the concentrated winding. The cross sectional shape of the conducting wire 30 constituting the first winding 15 and the second winding 16 is substantially rectangular, and the conductor space factor in the slot can thus be further increased. The first winding 15 and the second winding 16 are wound in the form of the a winding, and the conductor space factor in the slot can thus be further increased.

When the first winding 15 and the second winding 16 are connected to each other in the slot, the connection portion 35 is disposed on the straight portions of the windings, which does not become an obstacle against the formation of the crank-shape portions. The number of turns of the first winding 15 and the second winding 16 are not an integer, and when the two lead wires 18 of each of the windings are arranged on the coil end potions on the both sides, the space used for the winding stage change and the like can be secured. When the first winding 15 and the second winding 16 are serially connected to each other on the coil end portion on one side, the coil end of the rotating electric machine can be downsized.

The cutout portion 22 is provided at the bottom of the tooth portion 10*b* of the iron core 10, and the assembly of the stator 2 is thus facilitated. When the tooth portion 10*b* of the iron core 10 is tapered, the core loss of the stator iron core 10 decreases.

The manufacturing method for the rotating electric machine 1 includes the first step of forming the first windings 15 and the second windings 16, the second step of combining the first windings 15 and the second windings 16 by intersecting the first windings 15 and the second windings 16 with each other to produce the coils 14, and the third step of inserting the coils 14 into the slots 12 of the iron core 10 to assemble the coils 14 to the iron core 10. As a result, the rotating electric machine 1 having the downsized coil end portions and stator 2 (or rotor) can be manufactured.

A plurality of coils 14 are produced, and all the coils 14 are respectively inserted into the corresponding slots 12 of the iron core 10 simultaneously, thereby simultaneously assembling the coils 14 to the iron core 10. As a result, the stator 2 is properly assembled.

A description is now given of a comparison result between a prototype of the rotating electric machine according to the conventional technology having a winding structure in the distributed form and a prototype of the rotating electric machine 1 according to the embodiment. In both the prototype of the rotating electric machine 1 and the prototype of the rotating electric machine of the conventional technology, the diameters and the axial lengths of the iron cores of the stators were the same, the rotors were the same, and all materials of the electromagnetic steel plates, the conducting wires (copper wires), the magnets, and the like were the same. Moreover, in both the prototypes, the maximum instantaneous torques, the maximum instantaneous outputs, the maximum rotation speeds, and the maximum current densities of the windings are the same.

A size ratio of the coil end with respect to the iron core is small (25%) for the prototype of the rotating electric machine 1, and the size ratio is large (47%) for the prototype of the rotating electric machine of the conventional technology. It is understood that the coil end of the rotating electric machine 1 according to the embodiment is downsized compared with the coil end of the rotating electric machine of the conventional technology. It should be noted that the size ratio of the coil end is obtained by an equation: (LE/LC)×100%, based on a length LE of the coil end in the axial direction of the rotating electric machine, and a length LC of the iron core in the axial direction. Moreover, through the downsizing of the coil end, the size of the prototype according to the embodiment became 85% (=125/147×100%) with respect to the size of the prototype of the conventional technology.

The space factor of the winding defined as described above is large (55%) for the prototype of the rotating electric machine 1, and the space factor is small (45%) for the prototype of the rotating electric machine of the conventional technology. It is understood that, in the rotating electric machine 1 according to the embodiment, more conducting wires than those of the rotating electric machine of the conventional technology pass in the single slot. Moreover, at the rotation speed of 10,000 rpm, the output (output torque) of the prototype of the rotating electric machine 1 increased by 30% from the output (output torque) of the prototype of the rotating electric machine of the conventional technology.

This invention is not limited to the above-mentioned embodiment, and various modifications and changes are possible within the technical idea thereof, and the modifications and changes are apparently included in the technical scope of this invention.

The entire disclosure of Japanese Patent Application No. 2010-211193, filed on Sep. 21, 2010 is incorporated herein by reference.

The invention claimed is:

1. A winding structure for a rotating electric machine, comprising:
    a core including a plurality of slots; and
    a coil including a first winding and a second winding combined by intersecting the first winding and the second winding with each other, the first winding and the second winding each comprising a pair of straight portions and a pair of coil end portions connecting the pair of straight portions, wherein:
    the pair of straight portions of the first winding and the pair of straight portions of the second winding are inserted into a same pair of slots among the plurality of slots so that the coil is assembled to the core;
    the coil end portions of the first winding and the second winding each comprise:
    a first crank-shape portion bending in a rotation axis direction of the rotating electric machine; and
    a second crank-shape portion bending in a radial direction of the rotating electric machine; and
    when viewing from the rotation axis direction, the first crank-shape portion of the first winding intersects with the second crank-shape portion of the second winding, and the second crank-shape portion of the first winding intersects with the first crank-shape portion of the second winding.

2. The winding structure according to claim 1, further comprising a second coil, wherein:
    the first winding of the coil overlaps, at a coil end portion, a second winding of the second coil; and
    the second winding of the coil overlaps, at a coil end portion, a first winding of the second coil.

3. A rotating electric machine, comprising the winding structure according to claim 1.

4. The rotating electric machine according to claim 3, wherein a winding pitch of winding the coil on the slots of the core is two.

5. The rotating electric machine according to claim 3, wherein a number of intersections of the first winding and the second winding at the coil end portions is two.

6. The rotating electric machine according to claim 3, wherein a number of the slots of the core is twice to three times a number of magnetic poles of the rotating electric machine.

7. The rotating electric machine according to claim 3, wherein a number of phases of the rotating electric machine is five and a ratio of a number of the slots of the core to a number of magnetic poles of the rotating electric machine is 5:2, or the number of the phases of the rotating electric machine is three and the ratio of the number of the slots of the core to the number of the magnetic poles of the rotating electric machine is 3:1.

8. The rotating electric machine according to claim 3, wherein the first winding and the second winding are wound in a form of a normal winding.

9. The rotating electric machine according to claim 3, wherein the first winding and the second winding are formed of conducting wires having a substantially rectangular cross sectional shape.

10. The rotating electric machine according to claim 3, wherein the first winding and the second winding are wound in a form of an α winding.

11. The rotating electric machine according to claim 3, wherein the first winding and the second winding are connected to each other in the slots.

12. The rotating electric machine according to claim 3, wherein a number of turns of the first winding and a number of turns of the second winding are non-integers, and two lead wires of each of the first winding and the second winding are located at the coil end portions on both sides.

13. The rotating electric machine according to claim 3, wherein the first winding and the second winding are serially connected to each other at a coil end portion on one side.

14. The rotating electric machine according to claim 3, further comprising a cutout portion provided at a bottom of a tooth portion of the core.

15. The rotating electric machine according to claim 3, wherein a tooth portion of the core has a tapered shape.

16. A manufacturing method for a rotating electric machine, comprising:
    a first step of forming a first winding and a second winding each comprising:
    a first crank-shape portion bending in one direction; and
    a second crank-shape portion bending in a direction perpendicular to the one direction;
    a second step of combining the first winding and the second winding by intersecting the first winding and the second winding with each other to produce a coil in a manner that the first crank-shape portion of the first winding is fitted to and intersects with the second crank-shape portion of the second winding, and the second crank-shape portion of the first winding is fitted to and intersects with the first crank-shape portion of the second winding; and
    a third step of inserting the coil into a pair of slots of a core to assemble the coil to the core in a manner that the first crank-shape portion and the second crank-shape portion are included in a coil end portion and that both the first winding and the second winding pass through a same pair of slots,
    wherein, after the coil is assembled to the core, the one direction corresponds to a rotation axis direction of the rotating electric machine, and the direction perpendicular to the one direction corresponds to a radial direction of the rotating electric machine.

17. The manufacturing method according to claim 16, wherein the third step comprises:
    producing a plurality of the coils; and
    inserting all the plurality of the coils respectively and simultaneously into corresponding slots of the core to assemble the plurality of the coils simultaneously to the core.

* * * * *